(12) United States Patent
Kodama et al.

(10) Patent No.: US 6,863,419 B2
(45) Date of Patent: Mar. 8, 2005

(54) ILLUMINATION OPTICAL SYSTEM, IMAGE DISPLAY OPTICAL SYSTEM, PROJECTION TYPE IMAGE DISPLAY APPARATUS, AND IMAGE DISPLAY SYSTEM

(75) Inventors: Hiroyuki Kodama, Tochigi (JP); Atsushi Okuyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/213,136

(22) Filed: Aug. 5, 2002

(65) Prior Publication Data

US 2003/0067776 A1 Apr. 10, 2003

(30) Foreign Application Priority Data

Aug. 10, 2001 (JP) .......................................... 2001-244910
Aug. 10, 2001 (JP) .......................................... 2001-244911

(51) Int. Cl.$^7$ ............................................... F21V 5/04
(52) U.S. Cl. ..................... 362/268; 362/293; 362/30; 362/301; 362/299; 362/275; 362/328; 362/331
(58) Field of Search ................................. 362/268, 277, 362/275, 293, 328, 331, 30, 301, 299; 353/31, 33, 34, 37, 20, 38, 102; 349/5, 7, 8

(56) References Cited

U.S. PATENT DOCUMENTS

| | | | | |
|---|---|---|---|---|
| 1,661,757 A | * | 3/1928 | Jones | ............................. 353/31 |
| 5,657,166 A | * | 8/1997 | Otaki | ............................ 359/661 |
| 5,934,778 A | * | 8/1999 | Shioya | ............................. 353/31 |
| 6,231,193 B1 | | 5/2001 | Sugawara | |
| 6,464,362 B1 | | 10/2002 | Sugawara et al. | |
| 2003/0025883 A1 | * | 2/2003 | Yajima | ............................. 353/38 |

FOREIGN PATENT DOCUMENTS

| | | | |
|---|---|---|---|
| JP | 08203148 A | * 8/1996 | ........... G11B/7/135 |
| JP | 10-241437 | 9/1998 | |
| JP | 2000-098488 | 4/2000 | |
| JP | 2000-137204 | 5/2000 | |
| JP | 2000-241882 | 9/2000 | |
| JP | 2002-296538 | 10/2002 | |

OTHER PUBLICATIONS

English Abstract for Japanese Patent Application Publication No. 10–241437.
English Abstract for Japanese Patent Application Publication No. 2000–137204.

* cited by examiner

Primary Examiner—Stephen Husar
Assistant Examiner—Sharon Payne
(74) Attorney, Agent, or Firm—Morgan & Finnegan, LLP

(57) ABSTRACT

An illumination optical system that illuminates a plurality of image display elements comprises; a color separating optical system that separates light emitted from a light source into a plurality of color light components; and a plurality of light-guiding optical systems, each of which guides light component to a corresponding one of the plurality of image display elements. An illumination area on the image display element that is illuminated by at least one of the plurality of light-guiding optical systems is larger than those on the image display elements illuminated by the other ones of the plurality of light-guiding optical systems. This provides a compact projection type image display apparatus which can project bright images.

23 Claims, 14 Drawing Sheets

FIG.5

| λ (nm) | ȳ(λ) |
|---|---|
| 400 | 0.0004 |
| 405 | 0.0006 |
| 410 | 0.0012 |
| 415 | 0.0022 |
| 420 | 0.004 |
| 425 | 0.0073 |
| 430 | 0.0116 |
| 435 | 0.0168 |
| 440 | 0.023 |
| 445 | 0.0298 |
| 450 | 0.038 |
| 455 | 0.048 |
| 460 | 0.06 |
| 465 | 0.0739 |
| 470 | 0.091 |
| 475 | 0.1126 |
| 480 | 0.139 |
| 485 | 0.1693 |
| 490 | 0.208 |
| 495 | 0.2586 |
| 500 | 0.323 |
| 505 | 0.4073 |
| 510 | 0.503 |
| 515 | 0.6082 |
| 520 | 0.71 |
| 525 | 0.7932 |
| 530 | 0.862 |
| 535 | 0.9149 |
| 540 | 0.954 |
| 545 | 0.9803 |
| 550 | 0.995 |

| λ (nm) | ȳ(λ) |
|---|---|
| 555 | 1 |
| 560 | 0.995 |
| 565 | 0.9786 |
| 570 | 0.952 |
| 575 | 0.9154 |
| 580 | 0.87 |
| 585 | 0.8163 |
| 590 | 0.757 |
| 595 | 0.6949 |
| 600 | 0.631 |
| 605 | 0.5668 |
| 610 | 0.5033 |
| 615 | 0.4412 |
| 620 | 0.381 |
| 625 | 0.321 |
| 630 | 0.265 |
| 635 | 0.217 |
| 640 | 0.175 |
| 645 | 0.1382 |
| 650 | 0.107 |
| 655 | 0.0816 |
| 660 | 0.061 |
| 665 | 0.0446 |
| 670 | 0.032 |
| 675 | 0.0232 |
| 680 | 0.017 |
| 685 | 0.0119 |
| 690 | 0.0082 |
| 695 | 0.0057 |
| 700 | 0.0041 |

ILLUMINATION AREA ON
IMAGE DISPLAY ELEMENT

ILLUMINATION AREA ON
IMAGE DISPLAY ELEMENT

FIG.12 (A) (PRIOR ART)
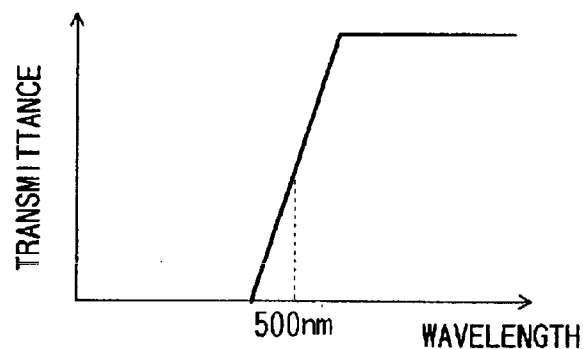
FIG.12 (B) (PRIOR ART)
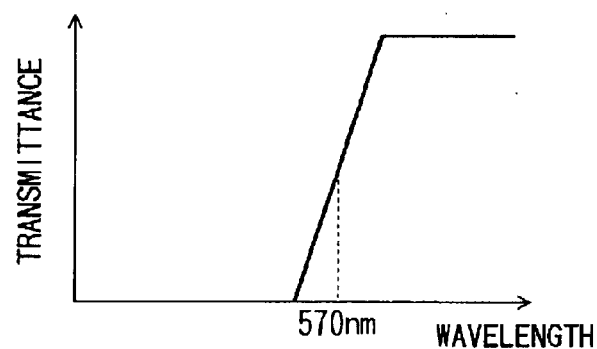
FIG.12 (C) (PRIOR ART)
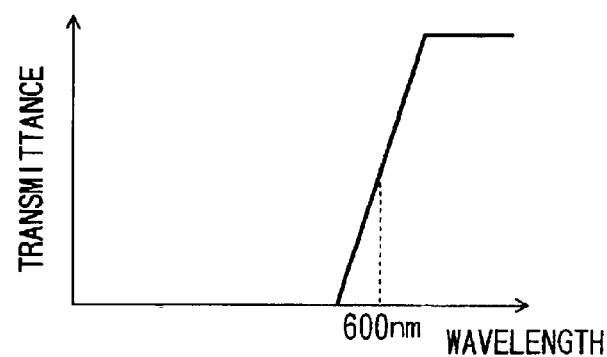

ILLUMINATION AREA

ILLUMINATION OPTICAL SYSTEM, IMAGE DISPLAY OPTICAL SYSTEM, PROJECTION TYPE IMAGE DISPLAY APPARATUS, AND IMAGE DISPLAY SYSTEM

BACKGROUND OF THE INVENTION

1. Field of the Invention

The present invention relates to an illumination optical system that illuminates an image display element homogeneously, and an image display optical system and a projection type image display optical system that use the illumination optical system.

2. Description of the Related Art

In recent years, there has been a demand for a compact projection type image display apparatus that projects an image having an improved brightness.

FIG. 11 shows the configuration of a conventional projection type image display apparatus. Referring to FIG. 11, white light emitted from a light source 301 is reflected by a reflector 302, passes through a fly-eye lens 303, and is reflected by a mirror M301. Then, the light passes through a fly-eye lens 304, a polarization converting element 305 and a condenser lens 306 and the like, and then enters a dichroic mirror DM301.

Of the white light incident on the dichroic mirror DM301, light component in the blue band is reflected by the dichroic mirror DM301 and light component in the green and red bands pass through the dichroic mirror DM301. A halogen lamp, a metal halide lamp, or an ultra high-pressure mercury lamp and the like is generally used as the light source.

The light component in the blue band, reflected by the dichroic mirror DM301 that has a spectral transmittance shown in FIG. 12(A), passes a negative lens 307B, redirected by 90 degrees by a reflection mirror M302. Then, the light component in the blue band passes through a field lens 308B and enters an image display element 309B. The light component is the blue band is modulated with an image (liquid crystal image) formed by the image display element 309B.

The modulated light component in the blue band enters a dichroic prism 310, which redirects the light component by 90 degrees to an object lens 311.

The light components in the green and red bands that have passed the dichroic mirror DM301 passes a negative lens 307G and then enters a dichroic mirror DM302 having the spectral transmittance shown in FIG. 12(B). As is clear from FIG. 12(B), the dichroic mirror DM302 has the property that it reflects light component in the green band. Therefore, the dichroic mirror DM302 reflects the light component so that the light component is redirected by 90 degrees to enter an image display element 309G through a field lens 308G. The light component in the green band is modulated with an image formed by the image display element 309G.

The modulated light component in the green band enters the dichroic prism 310 and then a projection lens 311.

The light component in the red band that has passed the dichroic mirror DM302 passes through a trimming filter TR0 having a spectral transmittance shown in FIG. 12(C), a condenser lens 312, a relay lens 313, a field lens 308R, and reflection mirrors M303 and M304, then enters an image display element 309R. The light component in the red band is modulated with an image formed by the image display element 309R.

The modulated light component in the red band enters the dichroic prism 310, which redirects the red component by 90 degrees so that the red component to enter the projection lens 311.

In this manner, image light components of the respective colors combined by the dichroic prism 310 are projected onto a projection surface, for example, a screen by the projection lens 311.

With the aforementioned projection type image display apparatus, light having substantially homogeneous intensity illuminates the image display element. The area of homogeneous intensity is referred to as illumination area hereinafter. The illumination area is larger than the display area of the image display element so as to keep a margin of the illumination area with respect to the display area of the image display element due to the tilt of mirrors and eccentricity of the lenses, and to allow for shrinkage of the illumination area due to differences in curvature among the lenses and the distances between the lenses.

However, if the margin of the illumination area is too larger than the display area of the image display element, light which is not actually projected onto the screen increases, and therefore the image on the screen has less brightness. For this reason, an adjusting mechanism is provided to move the lens upward and downward and leftward and rightward and to tilt the mirrors, so that the illumination area can be adjusted to a minimum necessary size.

For the aforementioned projection type image display apparatus incorporating a plurality of image display elements, the positional errors of the illumination areas with respect to the respective image display elements need to be corrected.

For example, with a projection type image display apparatus as shown in FIG. 11 is provided with adjusting mechanisms: an adjusting mechanism that moves the condenser lens 306 upward and downward and leftward and rightward to correct the positional errors of the illumination areas of the light component in the green band, an adjusting mechanism that moves the negative lens 307B upward and downward and leftward and rightward to correct the positional errors of the illumination areas of the light component in the blue band, and an adjusting mechanism that moves the relay lens 313 upward and downward and leftward and rightward to correct the positional errors of the illumination areas of the light component in the red band. By using these adjusting mechanisms, the positions of the illumination areas are adjusted.

As mentioned above, the adjusting mechanism is required for each color of light and therefore the conventional art presents the problem of large size, poor assembly efficiency, and increased costs of the apparatus.

FIG. 13 shows a configuration of another conventional projection type image display apparatus. Referring to FIG. 13, a beam of white light is emitted from a light source 401 in the form of, for example, a halogen lamp, a metal halide lamp, or a ultra high-pressure mercury lamp or the like, and a portion of the flux of white light enters fly-eye lens 403 and 404 directly and the remaining portion of the flux of white light is reflected by a reflector 402 and enters the fly-eye lenses 403 and 404, so that the flux of white light is divided into a plurality of light flux portions. The plurality of light flux portions are polarized in the same direction by a PS conversion element 405, and then pass a condenser lens 406 and a field lens 407. This causes the light flux to have a substantially homogeneous intensity distribution. Thereafter, the light flux enters an image display element 408 in the form of, for example, a LCD and the like.

The image display element 408 forms an image in accordance with an input signal thereto and modulates the light, which has entered the image display element 408, with the image, so that the modulated light is projected by the projection lens 409 onto a screen, not shown.

The brightness of the image projected from the projection type image display apparatus greatly depends on the balance of the incidence angle of the illumination light that is incident on the image display element 408 and the F-number of the projection lens 409.

For the image display apparatus shown in FIG. 13, the incident angle of the illumination light that is incident upon the image display element 408 is determined substantially by the diameter of the condenser lens 406 and the distance D between the condenser lens 406 and the image display element 408.

If the distance D is made shorter in an attempt to miniaturize the apparatus, the incident angle of the illumination light incident upon the image display element 408 becomes large, so that a large portion of luminous flux cannot enter the pupil of the projection lens 409, decreasing the brightness of projected image.

One way of solving this problem is to dispose a concave lens between the condenser lens 406 and the image display element 408 as proposed in Japanese Patent Laid-Open No. 2000-98488 and Japanese Patent Laid-Open 2000-241882.

This method provides a shorter distance between the condenser lens and the image display element without increasing the incidence angle of the illumination light incident upon the image display element 408. Thus, this method provides a bright display image and a miniaturized apparatus.

However, as mentioned in the above publications, when the condenser lens is convex on its both sides, the apparatus is prone to outward coma aberration in the illumination area on the image display element 408 as shown in FIG. 14.

The amount of light becomes small at the four corners of the screen where the image height is largest. In order to ensure homogeneous intensity of light illuminating the image display element, the illumination area should be made larger. This decreases the amount of light that is not projected onto the screen, decreasing the brightness of the image projected onto the screen.

SUMMARY OF THE INVENTION

An object of the invention is to provide an illumination optical system, an image display optical system, and a projection type image display apparatus, which are compact but provide a bright displayed image.

In order to accomplish the aforementioned object, an illumination optical system of the invention that illuminates a plurality of image display elements comprises a color separating optical system that separates the light emitted from a light source into a plurality of color light components; and a plurality of light-guiding optical systems each of which guides each of color light components to a corresponding image display element;

wherein one of the plurality of light-guiding optical systems illuminates a larger area on the image display element than another of the plurality of light-guiding optical systems.

An illumination optical system of the invention that illuminates a plurality of image display elements comprises; a color separating optical system that separates the illumination light emitted from a light source into a plurality of color light components; and a plurality of light-guiding optical systems, each of which guides each of the color light components to a corresponding image display element;

wherein one of the plurality of light-guiding optical systems has a larger focal length than another of the plurality of light-guiding optical systems.

An illumination optical system of the invention that illuminates an image display element, comprises source; a light dividing optical system that divides illumination light flux emitted from a light source into a plurality of light flux portions; a homogenizing optical system that illuminates the image display element by using the plurality of light flux portions in such a way that the image display element is illuminated with light having substantially homogeneous intensity distribution.

And the homogenizing optical system has at least one positive lens and at least one negative lens, the positive lens is at a position closest to the light dividing optical system, and the following condition is satisfied, $$-2 \leq (R1+R2)/(R1-R2) \leq -1 \quad (1)$$

where R1 is a radius of curvature of a surface of the positive lens on the light dividing optical system side and R2 is a radius of curvature of a surface of the positive lens on the image display element side.

An illumination optical system of the invention that illuminates an image display element comprises; a light dividing optical system that divides illumination light flux emitted from a light source into a plurality of light flux portions; a homogenizing optical system that illuminates the image display element by using the plurality of light flux portions in such a way that the image display element is illuminated with light having substantially homogeneous intensity distribution.

And the homogenizing optical system is configured such that inward coma aberration is generated in the light illuminates the image display element.

A detailed configuration of the illumination optical system, image display optical system, projection type image display apparatus, and image display system of the invention, the above and other objects and features of the invention will be apparent from the embodiments, described below.

BRIEF DESCRIPTION OF THE DRAWINGS

FIG. 5 is a table that lists values of y(λ), one of three stimulus values of the spectrum of XYZ colorimetric system;

FIGS. 12(A), 12(B), and 12(C) are graphs that show wavelength versus spectral transmittance of dichroic mirror and trimming filter used in the conventional projection type image display apparatus shown in FIG. 11;

DETAILED DESCRIPTION OF THE PREFERRED EMBODIMENTS

Hereinafter, preferred embodiments of the invention will be described in detail with reference to the drawings.

Figure 1:
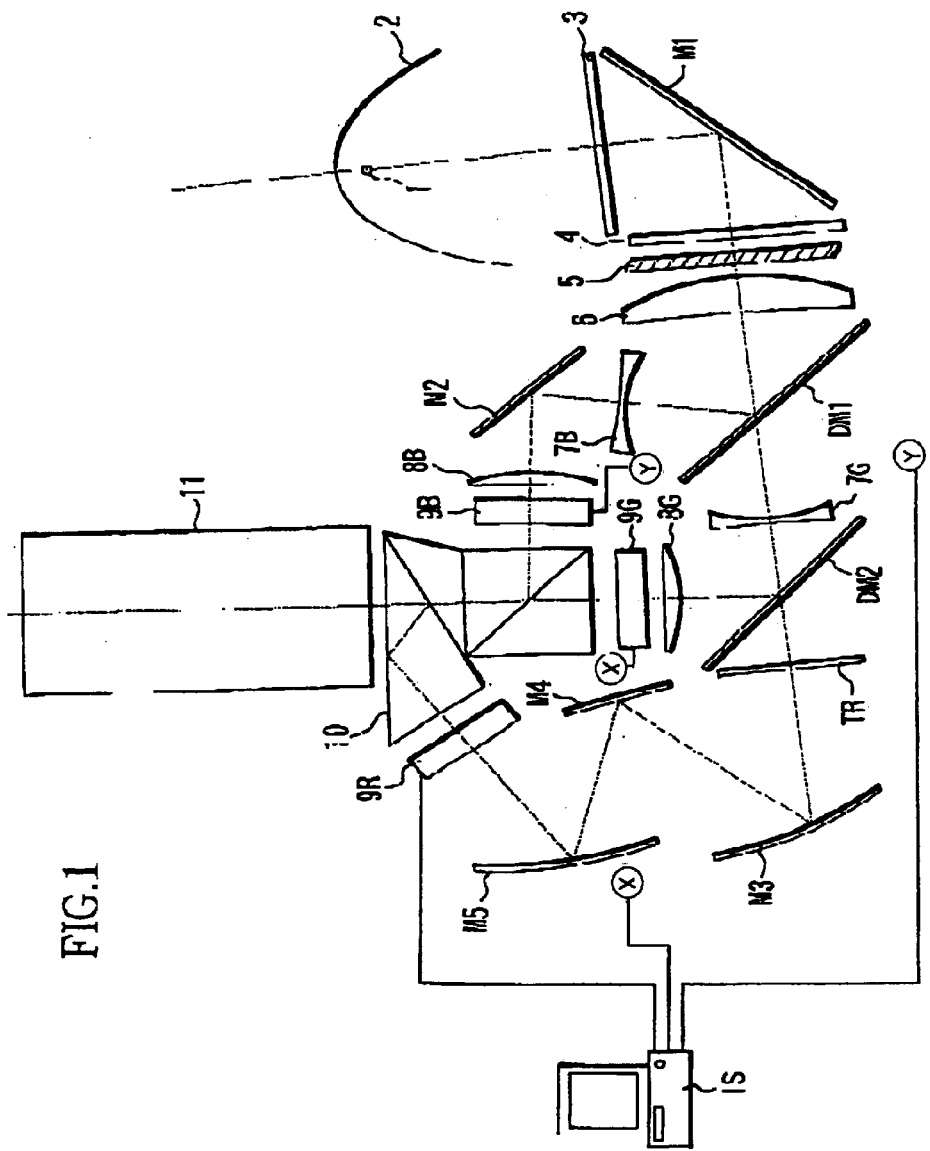
FIG. 1 shows a configuration of a projection type image display apparatus according to an embodiment of the invention.
Figure 2:
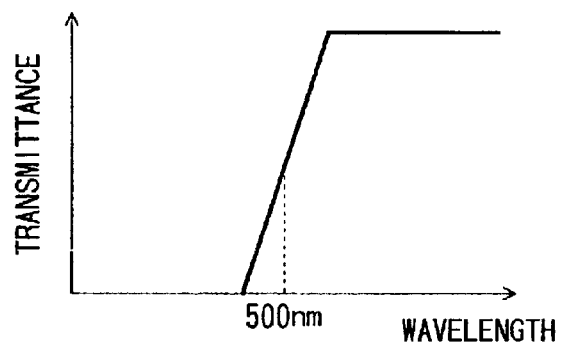
FIGS. 2(A), 2(B), and 2(C) are graphs showing wavelength versus spectral transmittance characteristic of a dichroic mirror and trimming filter for use in a projection type image display apparatus in FIG. 1.
Figure 2:
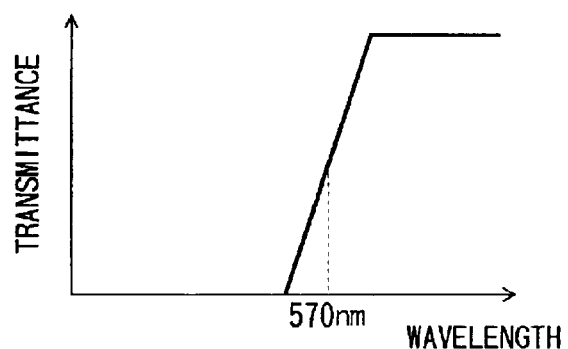
Figure 2:
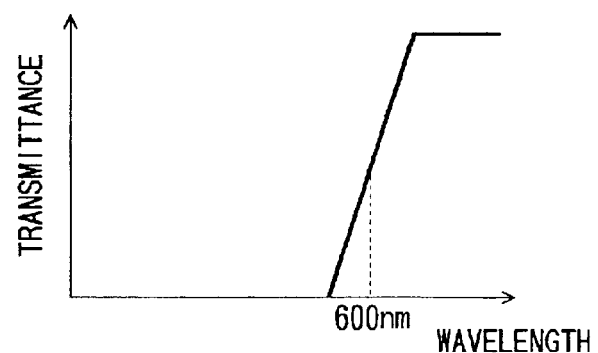

FIG. 1 shows an image display optical system for a projection type image display apparatus according to an embodiment of the present invention. FIG. 2(A), 2(B), and 2(C) show the spectral transmittance of dichroic mirrors DM1 and DM2 a trimming filter TR used in the projection type image display apparatus. These values of spectral transmittance are design examples when an ultra high-pressure mercury lamp is used as a light source. It should be noted that these values are only exemplary and not limitative. The values of spectral transmittance can be different depending on the type of the light source.

Referring to FIG. 1, white light is emitted from a light source 1 and reflected by a reflector 2, then passes through a first fly-eye lens 3. Then, the light is reflected by a mirror M1 and then passes through a second fly-eye lens 4, a polarization conversion element 5, and a condenser lens 6, and finally enters a dichroic mirror (color separating optical system) DM1.

The illumination light flux is split by the fly-eye lenses 3 and 4 (light dividing optical system) into a plurality of light flux portions. Then, the illumination light is aligned in polarization direction by the polarization conversion element 5 and converted into substantially parallel light by the condenser lens 6.

The dichroic mirror DM1 has a spectral transmittance shown in FIG. 2(A). The dichroic mirror DM1 reflects the light component in the blue band (blue light component) of the white light that enters the dichroic mirror DM1 and allows light components in the green and red bands to pass therethrough.

The blue light component reflected by the dichroic mirror DM1 passes through a negative lens 7B, is then redirected by a reflection mirror M2, and finally enters an image display element (for example, liquid crystal display element) 9B through a field lens 8B.

At this moment, by the optical actions of the condenser lens 6, negative lens 7B, and field lens 8B (these structural elements form a homogenizing optical system and similar homogenizing optical system may be formed for light paths of the other color light components), the blue light component having a substantially homogeneous intensity distribution illuminates a predetermined illumination area on the image display element 9B.

Image information supplied from an image information supply apparatus IS (e.g., personal computer, television, video player, and DVD player), drives the liquid image display element 9B to modulate the blue light component entering the image display element 9B.

The modulated blue light component enters a color combining dichroic prism 10, which redirects the path of the blue light component to a projection lens 11.

The dichroic prism 10 is a so-called 4P(pieces) prism that includes four prisms of different shapes bonded together by an adhesive with a wavelength selective reflection (dichroic) layer sandwiched between the prisms. A so-called cross dichroic prism or a 3P(pieces) prism may be used in place of the dichroic prism 10. The cross dichroic prism is of the configuration in which four triangular prisms are bonded together by an adhesive and a wavelength selective reflection (dichroic) layer is substantially in the shape of a cross. The 3P prism is of the configuration in which three prisms of different shapes are bonded together.

The light component in the green and red bands (green and red light component) that have passed the dichroic mirror DM1 passes through a negative lens 7G that has a shorter focal length than the negative lens 7B, and then enters the dichroic mirror (color separating optical system) DM2 having a spectral transmittance shown in FIG. 2(B).

As is clear from FIG. 2(B), the dichroic mirror DM2 is characterized in that it reflects the green light component. Thus, the green light component is reflected by the dichroic mirror DM2 and redirected so that the green light component passes through the field lens 8G to enter an image display element 9G.

At this moment, by the optical actions of the condenser lens 6, negative lens 7G, and field lens 8G, the green light component has a substantially homogeneous intensity distribution and illuminates a predetermined illumination area on the image display element 9G.

Image information supplied from the image information supply apparatus IS drives the liquid crystal display element 9G to modulate the green light component that enters the image display element 9B.

The modulated green light component enters the dichroic prism 10, and then the projection lens 11.

The red light component that has passed the dichroic mirror DM2 passes through the trimming filter TR having a spectral transmittance shown in FIG. 2(C), concave mirrors M3, M4, and M5, and then enters an image display element 9R.

At this moment, by the optical actions of the condenser lens 6 and concave mirrors M3, M4, and M5, the red light component has a substantially homogeneous intensity distribution and illuminates a predetermined illumination area on the image display element 9R.

Image information supplied from the image information supply apparatus IS drives the image display element 9R to modulate the red light component entering the image display element 9R.

The modulated red light component enters the dichroic prism 10, which redirects the path of the red light component to a projection lens 11, and then enters the projection lens 11.

The dichroic prism 10 combines the green, blue, red light components into a full-colored image light and the projection prism 11 expands and projects the combined full-colored image light onto a screen (a projection surface), not shown.

Of the image display optical systems, those from the light source 1 to the field lenses 8G and 8B and concave mirror M5 form an illumination optical system.

While the present embodiment has been described with respect to a case where the red light component travels in a longer path than the green and blue light components and three concave mirrors M3, M4, M5 are used in the light path for the red light component, the shape and number of mirrors are not limitative and an optical system that includes convex mirrors and/or flat mirrors may also be used. Further, a system where lenses and mirrors are combined as in the conventional art may also be used.

Although the present embodiment uses three image display elements, the number of image display elements are not limitative.

Figure 3A:
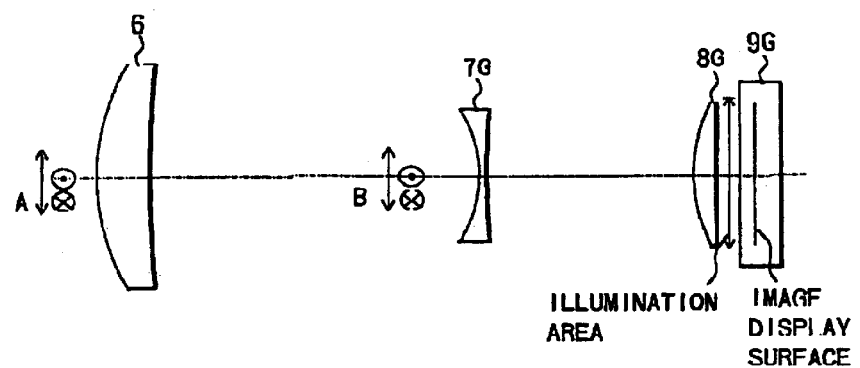
FIGS. 3(A) and 3(B) are developed views of light-guiding optical systems for light in the green band and blue band, the light-guiding optical systems being used in the projection type image display apparatus in FIG. 1.
Figure 3B:
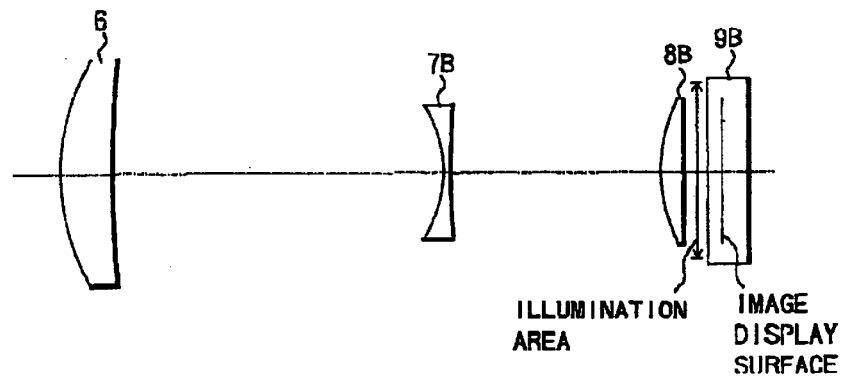

FIG. 3(A) and FIG. 3(B) are exploded views of light guiding optical systems for the green and blue light components, which include the condenser lens 6, the negative lenses 7G and 7B, field lenses 8G and 8B, and the image display surfaces of the image display elements 9G and 9B, respectively.

The following are numerical data of radius r of curvature of the optical surfaces of the respective lenses, distance d between lenses, refractive indexes n of the respective lenses, and Abbe's number ν. Further, symbol f is a focal length, fno is an F number and ω is a half value of field angle of the light-guiding optical system.

<Numerical embodiment 1>

(For green light component)

| | | | |
|---|---|---|---|
| f = 137.1 | fno = 1:2.5 | 2ω = 7.4° | |
| r1 = 49.715 | d1 = 8.45 | n1 = 1.713 | ν1 = 53.87 |
| r2 = 319.65 | d2 = 51.4 | | |
| r3 = −27.165 | d3 = 1.30 | n2 = 1.516 | ν2 = 64.14 |
| r4 = 226.60 | d4 = 33.15 | | |
| r5 = 36.474 | d5 = 3.6 | n3 = 1.516 | ν3 = 64.14 |
| r6 = ∞ | d6 = 6 | | |
| r7 = ∞ | | | |

(For blue light component)

| | | | |
|---|---|---|---|
| f = 146.6 | fno = 1:2.7 | 2ω = 7.4° | |
| r1 = 49.715 | d1 = 8.45 | n1 = 1.713 | ν1 = 53.87 |
| r2 = 319.65 | d2 = 51.4 | | |
| r3 = −31.771 | d3 = 1.30 | n2 = 1.583 | ν2 = 59.38 |
| r4 = 97.429 | d4 = 33.15 | | |
| r5 = 36.474 | d5 = 3.6 | n3 = 1.516 | ν3 = 64.14 |
| r6 = ∞ | d6 = 6 | | |
| r7 = ∞ | | | |

Although the focal length of the light-guiding optical system for the red light component is not described here, the focal length is substantially the same as that for the green light component. In other words, the focal length of the light-guiding optical system for the blue light component is the longest one of the focal lengths of the light-guiding optical systems for the three color light components.

Figure 4:
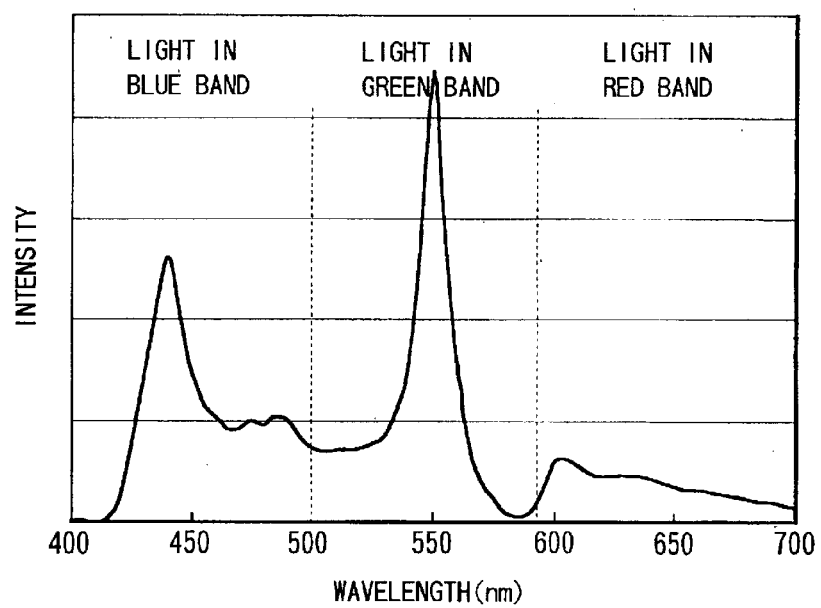
FIG. 4 is a graph, illustrating the spectral distribution on a screen when a ultra high-pressure mercury lamp is used.

FIG. 4 shows the spectral distribution of on the screen when a ultra high-pressure mercury lamp is used. FIG. 5 shows y(λ) that is one of three stimulus values for XYZ calorimetric system and the brightness of an image. For ultra high-pressure mercury lamps, the major wavelengths of the blue, green and red light components are near 440, 550, and 610 nm, respectively.

The values of y(λ) at these wavelengths indicate that the blue light component has least influence on the brightness, and therefore it is desirable that blue light illuminates a larger area or a light-guiding optical system for blue has a long focal length.

Also, it is desirable that the following condition is satisfied.

$$1 < fl/fs \leq 1.2 \qquad (2)$$

where fl is the longest of all focal lengths of the plurality of light-guiding optical systems and fs is the shortest of all focal lengths of the plurality of light-guiding optical systems.

In the numerical embodiment 1, there is the following relation and therefore Expression (2) is satisfied.

$$f_B/f_G = 1.07 < 1.2$$

where $f_G(=f_S)$ is the focal length of the light guiding optical system for the green light component and $f_B(=fl)$ is the focal length of the light guiding optical system for the blue light component.

If Expression (2) is not satisfied, for example, fl/fs>1.2, then the area illuminated by that color light component is much larger than those illuminated by the other light components, and greatly decreasing of the amount of that color light component which is actually projected occurs. Therefore, a projected image has not proper proportions of colors. For example, too small an amount of the blue light component causes a white image to look a yellowish image.

The projection type image display apparatus incorporates a first adjusting mechanism and a second adjusting mechanism. The first adjusting mechanism causes a drive mechanism (driven in the direction shown by arrow A in FIG. 3(A)), not shown, to drive the condenser lens (first optical element) 6 disposed between the three color light components, thereby adjusting the illumination area on the image display element 9G for the green light component. The second adjusting mechanism for the red light components, not shown, causes a drive mechanism to drive at least one (second optical element) of the concave mirrors M3, M4, and M5, thereby adjusting the illumination area on the image display element 9R for the red light component. By using these adjusting mechanisms, the illumination areas for the respective color light components are adjusted.

It is preferable that the direction in which the first adjusting mechanism drives the condenser lens 6 and the direction in which the second adjusting mechanism drives at least one of the concave mirrors M3, M4 and M5 are perpendicular to the optical axis. However, said first adjusting mechanism and said second adjusting mechanism can drive optical elements such as the condenser lens or the mirror in the direction of the optical axis, or can tilt them to the optical axis.

As shown in FIG. 3(B), the blue light component, which is directed to the image display element 9B through a light guiding optical system having a longer focal length than the others, illuminates a wider area (illumination area) than other color light components. Thus, the illumination area of the blue light component on the image display element 9B is a relatively wider area than the illumination areas of the green and red light components on the image display elements 9G and 9R.

For this reason, the light path for the blue light component does not require an adjusting mechanism for adjusting the illumination area, as opposed to the those for the green and red light components. In other words, a conventional projection type display apparatus or a conventional illumination optical system has an adjusting mechanism capable of adjusting illumination areas on the three image display elements independently. The present embodiment does not require adjustment of illumination area for blue light component but adjustment of illumination areas for only two color light, i.e., green and red. Thus, it is advantageous that the present embodiment requires less number of adjusting mechanisms than the conventional art.

Thus, the projection type display apparatus of the embodiment is compact and requires less number of steps for assembly operation and less manufacturing cost, as compared to the conventional art. The aforementioned "being capable of adjusting independently" means that the final result of adjustment is independent of the others. Therefore, even if illumination areas of the other color light components are affected during an adjustment of an illumination area for the color light component, the adjustment of illumination area for one of the color light component can still be said to be "independent", provided that illumination area can be adjusted independently of the others in terms of the final adjustment result.

Moreover, of the three color light components, the blue light component does not contribute to the brightness of a projected image significantly and has an illumination area with a large margin on the image display element. Thus, the projected image has a smaller decrease in brightness when only the blue light component has a large margin of illumination area than when the illumination areas of all of the three color light components have large margins respectively.

In the present embodiment, while the illumination area of the blue light component has a larger margin than the illumination areas of the other color light components, the configuration is not limited to this. The illumination areas of the blue and red light components may have larger margins than that of the green light component, and only an adjusting mechanism for the green light component may be provided.

In the aforementioned embodiment, concave lenses (negative lenses) having different focal lengths are employed so that the focal length of the illumination optical system for the green light component differs from that of the illumination optical system for the blue light component. The configuration is not limited to the employment of the concave lenses but different focal lengths may be set by changing the distance between the lenses or replacing the reflection mirror M2 by a mirror having a curved surface.

As described above, the projection type image display apparatus according to the embodiment can be applied to an image display system in which image display elements are driven in accordance with an image information supplied from an image information supply apparatus (e.g., personal computer, television, video player, and DVD player), thereby displaying or projecting images.

Further, as described above, according to the present embodiment, for one of the color lights that illuminates a larger area on the image display element than the other color lights, or for one of the color lights that is directed to the image display element through the optical system having a longer focal length than the other color lights, the margin of the illumination is relatively large and therefore an adjusting mechanism that adjusts the illumination area is not required. Thus, the embodiment can provide a compact image display apparatus, reduction of number of steps for assembly operation, and less manufacturing cost.

Moreover, only a selected one of the plurality of color light components illuminates an area with large margin on the image display element, and therefore the projected image has a small decrease in brightness as compared to a case where the illumination areas of all three color light components have large margins. Thus, the projection type image display apparatus can be compact while also display bright images.

Figure 6:
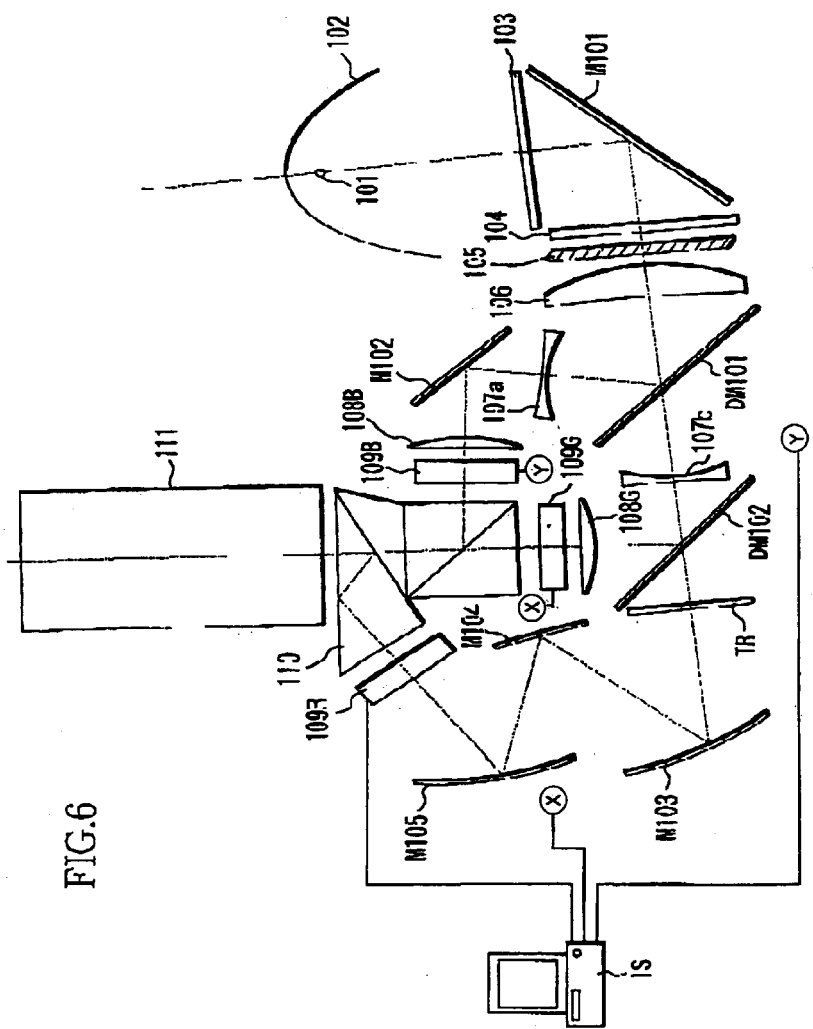
FIG. 6 is a cross-sectional view, showing an optical system for a projection type image display apparatus according to another embodiment of the invention.
Figure 7:
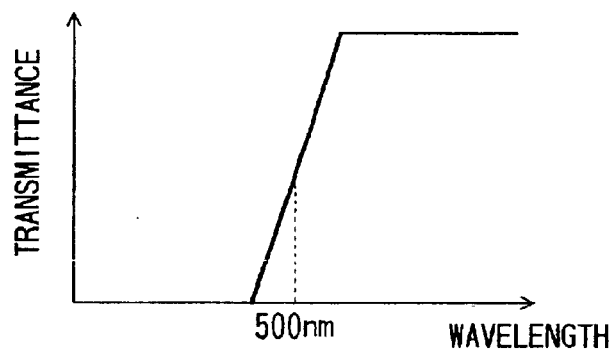
FIGS. 7(A), 7(B), and 7(C) illustrate the spectral transmittance of the dichroic mirror and trimming filter for use in the projection type image display apparatus in FIG. 6.
Figure 7:
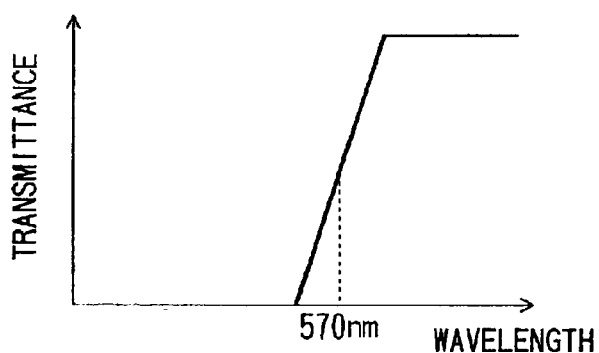
Figure 7:
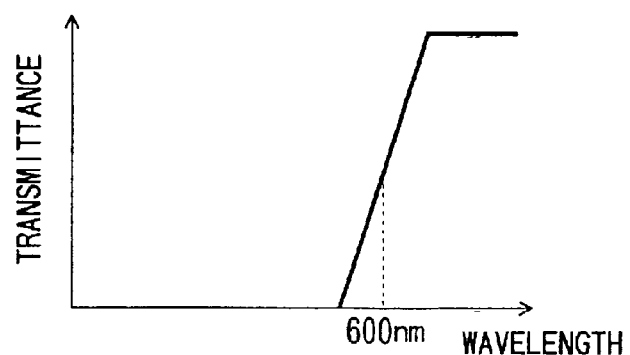

FIG. 6 shows the configuration of an image display optical system for a projection type image display apparatus according to another embodiment of the invention. FIGS. 7(A), 7(B), and 7(C) show spectral transmittance of dichroic mirrors DM101 and DM102 and a trimming filter TR, respectively. These values of spectral transmittance are design examples when an ultra high-pressure mercury lamp is used as a light source.

However, these values are only examples and the dichroic mirror and trimming filter used in an image display apparatus according to the present invention are not limited to these values. For example, the values of spectral transmittance can be different depending on the type of the light source.

Referring to FIG. 6, white light is emitted from a light source 101 and a portion of the white light enters a first fly-eye lens 103 directly, While the rest of the white light is reflected by a reflector 102 to the first fly-eye lens 103. The white light is reflected by a mirror M101 and then passes through a second fly-eye lens 104, a polarization conversion element 105, and a condenser lens 106. A halogen lamp, a metal halide lamp, or a ultra high-pressure mercury lamp or the like is used as the light source 101.

The first and second fly-eye lenses 103 and 104 (light dividing optical system) split the white light emitted from the light source 101 into a plurality of light flux portions. These light flux portions are aligned in polarization direction by the polarization conversion element 105 and converted into substantially parallel light by the condenser lens (positive lens) 106. The light exiting form the condenser lens 106 and having a substantially homogeneous intensity distributions illuminate later described image display elements. In other words, the polarization conversion element 105 and the condenser lens 106 form a homogenizing optical system.

The first dichroic mirror (color separating optical system) DM101 reflects light in the blue band (blue light component) of the white light exiting the condenser lens 106 and allows light in the green and red bands (green and red light components) to pass through.

The blue light component, reflected by the first dichroic mirror DM101 having the spectral transmittance shown in FIG. 7(A), passes through a negative lens 107a and is reflected by a reflection mirror M102 and then enters an image display element 109B through a field lens (positive lens) 108B.

At this moment, by the optical actions of the condenser lens 106, negative lens 107a, and field lens 108B, the blue light component having a substantially homogeneous intensity distribution illuminates a predetermined illumination area on the image display element 109B.

A drive signal supplied from a drive circuit, not shown, drives the image display element 109B to form a liquid crystal image, which modulates the blue light component. The drive circuit provides a drive signal to the image display element 109B in accordance with image signal inputted from an image information supply apparatus IS such as a personal computer, video player, television, and DVD player and the like.

The modulated blue light component enters a dichroic prism 110, which redirects the blue light component so that the blue light component enters the projection lens 111.

The dichroic prism (color combining optical system) 110 is an integral structure where four prisms are combined in integral form with a dichroic film having different spectral transmittance sandwiched between the prisms.

The green and red light components, which have passed the first dichroic mirror DM 101, passes through a negative lens 107b and then enters the second dichroic mirror (color separating optical system) DM102 having a spectral transmittance shown in FIG. 7(B). As is clear from FIG. 7(B), the second dichroic mirror DM102 reflects the green light component. Thus, the green light component is reflected by the second dichroic mirror DM102 and then enters an image display element 109G for green through a field lens (positive lens) 108G.

At this moment, by the optical actions of the condenser lens 106, negative lens 107b, and field lens 108G, the green light component having a substantially homogeneous intensity distribution illuminates a predetermined illumination area on the image display element 109G.

The image display element 109G is driven by a drive circuit, not shown, to form a liquid crystal image, which modulates the green light component incident thereon. The drive circuit provides the drive signal to the image display element 109G, the drive signal being in accordance with the image information received from the aforementioned image information supply apparatus.

The modulated green light component enters the dichroic prism 110, which redirects the green light component, and then enters the projection lens 111.

The red light component, which has passed the second dichroic mirror DM102, passes through the trimming filter TR having a spectral transmittance shown in FIG. 7(C), concave mirrors M103, M104, and M105, and finally enters an image display element 109R for red.

At this moment, by the optical actions of the condenser lens 106 and mirrors M103–M105, the red light component illuminates an illumination area on the image display element 109R.

The image display element 109R is driven by a drive circuit, not shown, to form a liquid crystal image, which modulates red light component incident thereon. The drive circuit provides the drive signal to the image display element 109R, the drive signal being in accordance with the image information received from the aforementioned image information supply apparatus.

The modulated red light component enters the dichroic prism 110 which redirects the red light component, and then enters the projection lens 111.

The blue, green and red light components that have entered the dichroic prism 110 are redirected by the dichroic prism 110 and combined into a full-colored image, which is enlarged and projected by the projection lens 111 onto a screen (projection surface), not shown.

Figure 8:
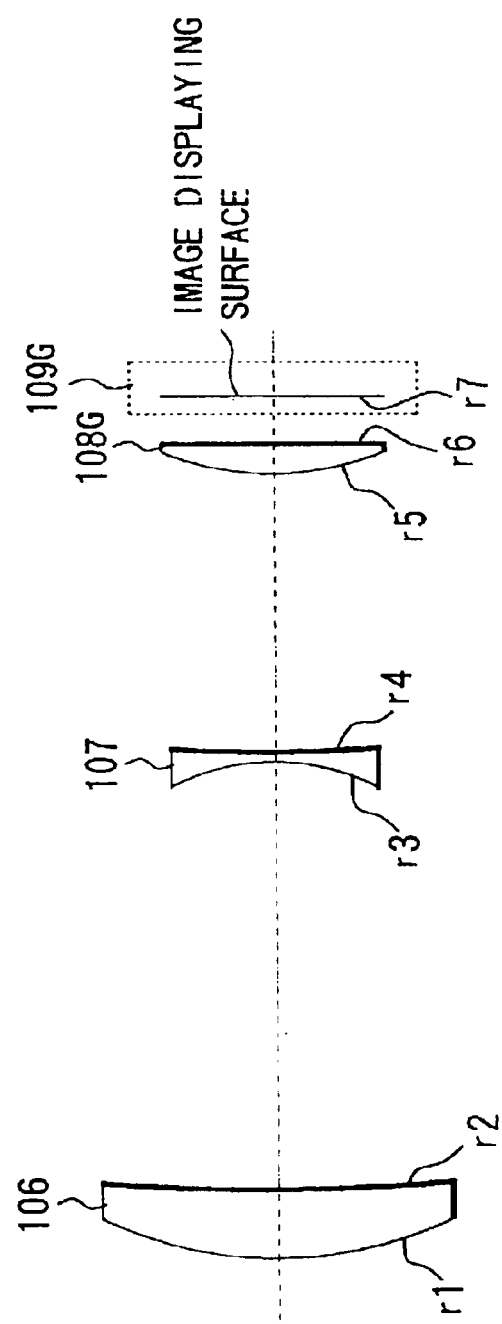
FIG. 8 is a developed view of optical elements from a condenser lens to an image display element of an optical path for the light in the green band used in the projection type image display apparatus in FIG. 6.

FIG. 8 is a developed view of structural elements from a condenser lens 106 closest to the fly-eye lenses 103 and 104 to the image display surface of the image display element 109G, the structural elements being disposed in the path of the illumination light for the green light component that affects the brightness of a projected image most.

The following are numerical embodiment 2 of the radius ri of curvature of the i-th optical surfaces from the incident surface of the condenser lens 106 to the image display element 109G, distance di (converted into values in air), refractive index ni of the materials of the respective optical elements, and Abbe's number vi. The symbol f is a focal length, fno is an F number, and ω is a half value of field angle.

<Numerical embodiment 2>

| | | | |
|---|---|---|---|
| f = 137.20 | fno = 1:2.5 | 2ω = 7.4° | |
| r1 = 49.748 | d1 = 8.45 | n1 = 1.713 | v1 = 53.87 |
| r2 = 319.65 | d2 = 51.4 | | |
| r3 = −27.165 | d3 = 1.30 | n2 = 1.516 | v2 = 64.14 |
| r4 = 226.60 | d4 = 33.15 | | |
| r5 = 36.474 | d5 = 3.6 | n3 = 1.516 | v3 = 64.14 |
| r6 = ∞ | d6 = 6 | | |
| r7 = ∞ | | | |

In the numerical embodiment 2, the shape of the condenser lens 106 is defined as follows:

$$(R1 + R2)/(R1 - R2) = (49.748 + 319.65)/(49.748 - 319.65)$$
$$= -1.37$$

where R1 is a radius of curvature of the surface of the condenser lens 106 on the light source 101 side and R2 is a radius of curvature of the surface on the image display element 109G side. The above relation satisfies Expression (1).

By satisfying the conditions of Expression (1), outward coma aberration of the illumination light on the image display element can be minimized, thereby preventing a decrease in the amount of light at four corners of the image display element where the image is highest. Satisfying the conditions of Expression (1) also minimizes an overall blur of the illumination area on the image display element and associated spherical aberration that leads to a decrease in the brightness of the displayed image. Thus, the intensity of the illumination light can be made homogeneous without increasing the illumination area on the image display element, while also providing a compact and bright display images.

Expression (1) describes the shape of a positive lens (e.g., condenser lens) at a position closest to the light-dividing optical system that divides the light flux emitted from the light source 101 into a plurality of light flux portions. For values greater than the upper limit of Expression (1), the apparatus is prone to outward coma aberration on the image display element and a decrease in the amount of light is prominent at four corners where the image is highest. Thus, In order to provide homogeneous intensity of light on the image display element, the illumination area needs to be widened. This increases light flux that is not actually projected on the screen, and decreases the brightness of the displayed image on the screen.

For values smaller than the lower limit Expression (1), correction of spherical aberration is difficult, causing a blur of the illumination area as well as decreasing the brightness of the image on the screen.

Figure 9:
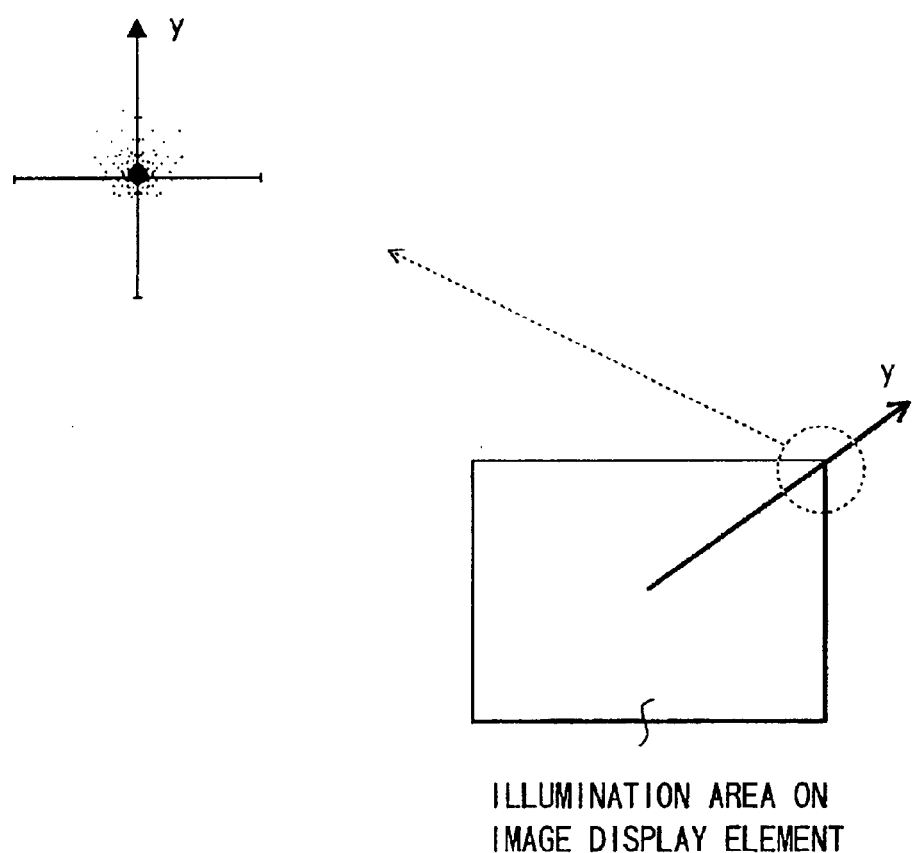
FIG. 9 shows the distribution of spots at four corners of an illumination area on an image display element in a second numerical embodiment of the projection type image display apparatus in FIG. 6.

FIG. 9 shows the distribution of spots (light intensity distribution) at four corners of an illumination area on the image display element 109G in the aforementioned numerical embodiment 2. As is clear form FIG. 9, the occurrence of outward coma aberration is minimized at four corners of the illumination area. The apparatus may be configured such that inward coma aberration occurs at four corners of the illumination area.

Because of the distribution in FIG. 9, the illumination light (the green light component) has a homogeneous distribution of light intensity and illuminates the image display element 109G without increasing the illumination area, thereby preventing the brightness of the projected image from decreasing.

On the other hand, by means of spreading the illumination area on one (or two) of the image display elements 109R, 109G, 109B, simple constitution and homogeneous light intensity distribution can be achieved in this embodiment. And constitution for satisfying the condition expressed by Expression (2) can be adopted in this embodiment.

Numerical embodiment 3 will be described where lenses are arranged just as in the numerical embodiment 2 but have different focal lengths.

<Numerical embodiment 3>

| | | | |
|---|---|---|---|
| f = 120.07 | fno = 1:2.2 | 2ω = 8.4° | |
| r1 = 50.966 | d1 = 8.45 | n1 = 1.713 | v1 = 53.87 |
| r2 = 263.51 | d2 = 51.4 | | |
| r3 = −38.020 | d3 = 1.30 | n2 = 1.516 | v2 = 64.14 |
| r4 = ∞ | d4 = 33.15 | | |
| r5 = 37.86 | d5 = 3.6 | n3 = 1.516 | v3 = 64.14 |
| r6 = ∞ | d6 = 6 | | |
| r7 = ∞ | | | |

In the numerical embodiment 3, the shape of the condenser lens 106 is defined as follows:

$$(R1 + R2)/(R1 - R2) = (50.966 + 263.51)/(50.966 - 263.51)$$

$$= -1.48$$

where R1 is a radius of curvature of the surface of the condenser lens 106 on the light source 101 side and R2 is a radius of curvature of the surface on the image display element 109G side. The above relation satisfies Expression (1).

Figure 10:
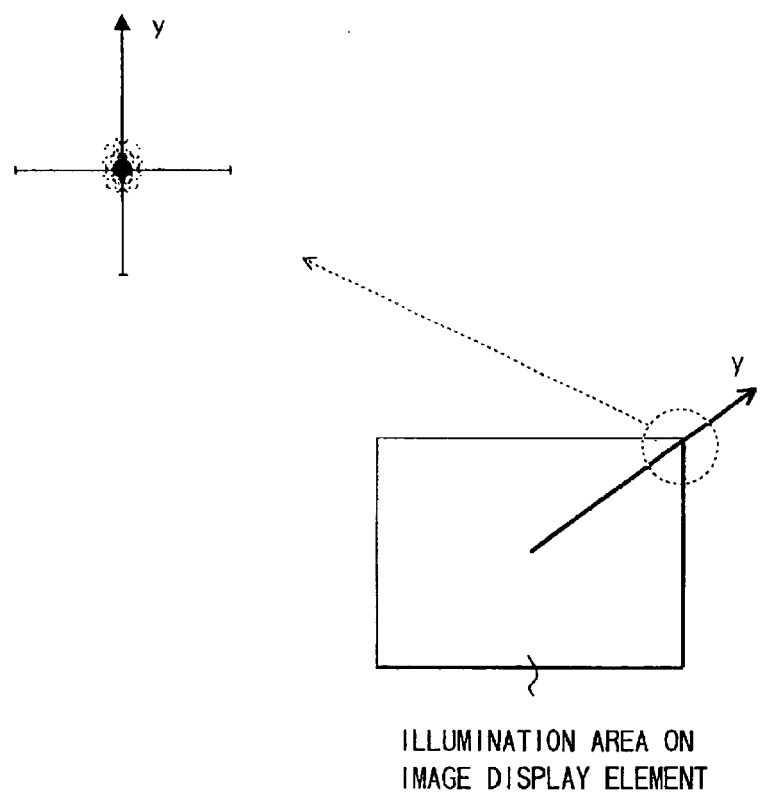
FIG. 10 shows the distribution of spots at four corners of an illumination area on an image display element in a third numerical embodiment of the projection type image display apparatus in FIG. 6.
Figure 11:
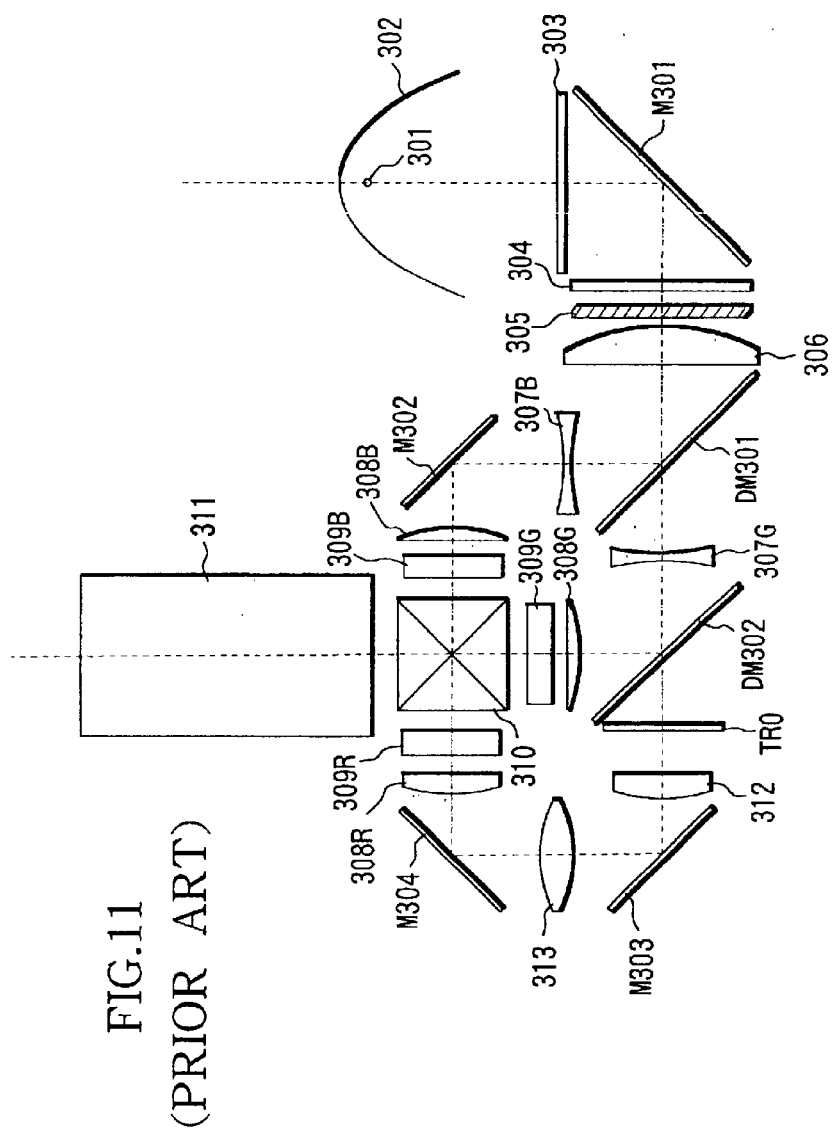
FIG. 11 shows the configuration of a conventional projection type image display apparatus.
Figure 13:
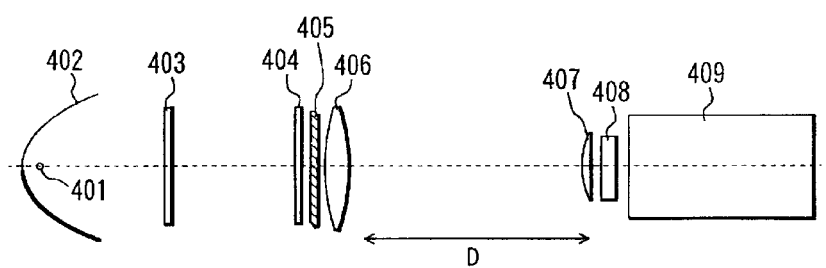
FIG. 13 is a developed view of an optical path of a conventional projection type image display apparatus.
Figure 14:
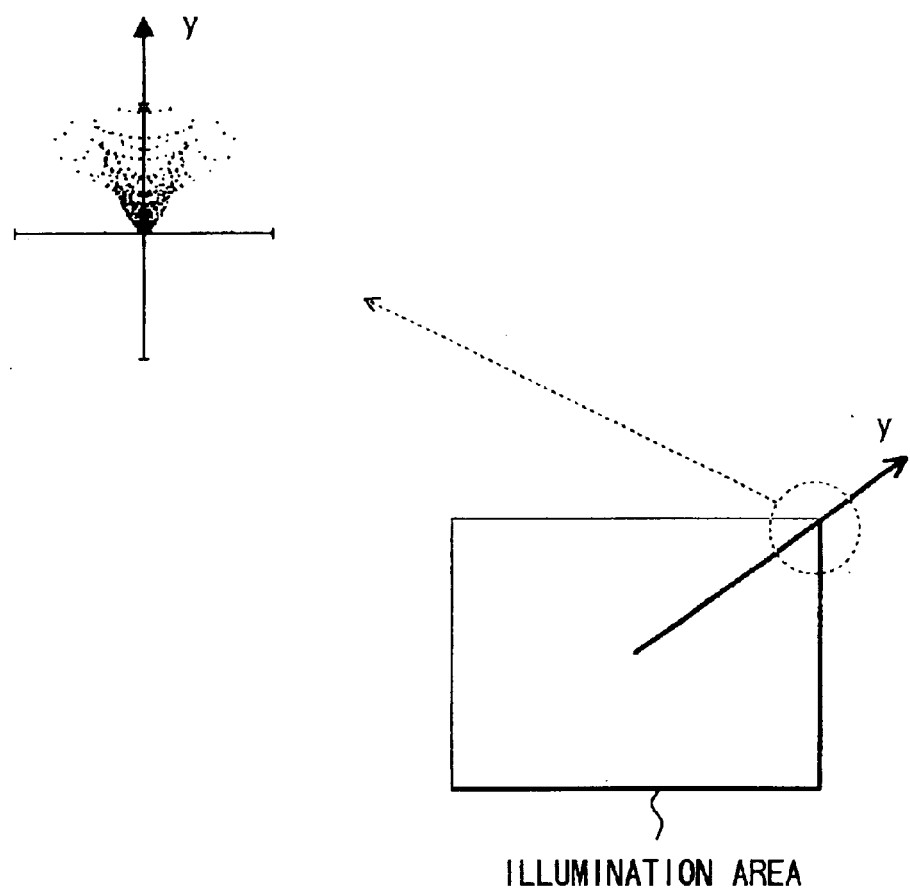
FIG. 14 shows a distribution of spots at four corners of an illumination area when a condenser lens having convex surfaces on its both sides is used in an illumination optical system for a conventional projection type image display apparatus.

FIG. 10 shows the distribution of spots (light intensity distribution) at four corners of the illumination area on the image display element 109G in the aforementioned numerical embodiment 3. As is clear form FIG. 10, the occurrence of outward coma aberration at four corners of the illumination area is minimized. The apparatus may also be configured such that inward coma aberration occurs at four corners of the illumination area.

Thus, the illumination light (green light component) has a homogeneous light intensity distribution and illuminates the image display element 109G without increasing the illumination area, thereby preventing the brightness of the projected image from decreasing.

On the other hand, by means of spreading the illumination area to one (or two) of the image display elements 109R, 109G, 109B, simple constitution and even illumination thereof can be achieved in this embodiment. And constitution for satisfying the condition express by Expression (2) can be adopted in this embodiment.

Although present embodiment has been described with respect to a case where three concave mirrors are disposed in the light path of the red light component that is longest, the shape and the number of the mirrors in the present invention are not limited to this configuration. The apparatus may include convex mirrors and/or flat mirrors may also be used. Further, a system where lenses and mirrors are combined may also be used.

Although present embodiment has been described with respect to an image display apparatus that employs three image display elements where each image display element is used for one of three different colors, the shape and the number of the mirrors in the present invention are not limited to this configuration. For example, the present invention may be applied to a single board type image display apparatus that employs only one image display element.

While the present embodiment has been described with respect to a so-called 4P(piece) prism employed as a dichroic prism, 3P prism or a cross dichroic prism may also be used.

As described above, according to the present invention, satisfying the conditions expressed by Expression (1) minimizes the occurrence of outward coma aberration of the illumination light on the image display element, thereby preventing a decrease in the amount of light at four corners of the illumination areas where the image height is largest. Alternatively, inward coma aberration may be generated in the illumination light on the image display element, thereby preventing the amount of light from decreasing at four corners of the image display element.

Moreover, occurrence of spherical aberration can be minimized which causes overall blur in the illumination area on the image display element and a decrease in the brightness of a projected image.

Thus, the intensity of illumination light can be made homogeneous without increasing the illumination area on the image display element, while also providing a compact and bright projected image.

While preferred embodiments have been described, it is to be understood that modification and variation of the present invention may be made without departing from the sprit or scope of the following claims.

What is claimed is:

1. An illumination optical system, which illuminates a plurality of image display elements, comprising:
   a color separating optical system, which separates illumination light emitted from a light source into a plurality of color light components; and
   a plurality of light-guiding optical systems, each of which guides each of said plurality of color light components to a corresponding one of the plurality of image display elements,
   wherein the following condition is satisfied, $$1 < fl/fs \leq 1.2$$

where fl is a longest one of focal lengths of said plurality of light-guiding optical systems and fs is a shortest one of focal lengths of said plurality of light-guiding optical systems.

2. A projection type image display apparatus comprising:
   the illumination optical system according to claim 1;
   a plurality of image display elements; and
   a projection optical system, which projects light from the plurality of image display elements onto a projection surface.

3. An illumination optical system, which illuminates a plurality of image display elements, comprising:
   a color separating optical system, which separates illumination light emitted from a light source into a plurality of color light components; and
   a plurality of light-guiding optical systems, each of which guides each of said plurality of color light components to a corresponding one of the plurality of image display elements,
   wherein each of at least two of said plurality of light-guiding optical systems includes a negative lens, and
   at least one of said light-guiding optical systems including said negative lens has a longer focal length than the other ones of said light guiding optical systems.

4. A projection type image display apparatus comprising:
   the illumination optical system according to claim 3;

a plurality of image display elements; and a projection optical system, which projects light from the plurality of image display elements onto a projection surface.

5. An illumination optical system, which illuminates a plurality of image display elements, comprising:

a color separating optical system, which separates illumination light emitted from a light source into a plurality of color light components; and a plurality of light-guiding optical systems, each of which guides each of said plurality of color light components to a corresponding one of the plurality of image display elements, wherein each of at least two of the plurality of light-guiding optical systems has a plurality of lenses including a negative lens, and at least one of said light-guiding optical systems having said negative lens differs from the other ones of said light-guiding systems in a distance by which said lenses are spaced apart.

6. A projection type image display apparatus comprising:

the illumination optical system according to claim 5;

a plurality of image display elements; and a projection optical system, which projects light from the plurality of image display elements onto a projection surface.

7. An image display system comprising:

a projection type image display apparatus which comprises:

a color separating optical system, which separates illumination light emitted from a light source into a plurality of color light components;

a plurality of light-guiding optical systems, each of which guides each of said plurality of color light components to a corresponding one of the plurality of image display elements;

a color combining optical system, which combines the plurality of color light components being modulated respectively by said plurality of image display elements; and a projection optical system, which projects the plurality of color light components combined by said color combining optical system onto a projection surface; and an image information supply apparatus, which supplies image information to said projection type image display apparatus, the image information being used to form an original image on said plurality of image display elements;

wherein the following condition is satisfied, $$1 < fl/fs \leq 1.2$$

where fl is a longest one of focal lengths of said plurality of light-guiding optical systems and fs is a shortest one of focal lengths of said plurality of light-guiding optical systems.

8. An illumination optical system, which illuminates a plurality of image display elements, comprising:

a color separating optical system, which separates illumination light emitted from a light source into a plurality of color light components; and a plurality of light-guiding optical systems, each of which guides each of said plurality of color light components to a corresponding one of the plurality of image display elements;

wherein one of said plurality of light-guiding optical systems has a longer focal length than another of said plurality of light-guiding optical systems.

9. The illumination optical system according to claim 8, wherein said color operating optical system separates the illumination light into a red light component, a green light component, and a blue light component, wherein a light-guiding optical system for the blue light component has a longer focal length than said light-guiding optical systems for the red and green light components.

10. The illumination optical system according to claim 8, wherein at least one of said plurality of light-guiding optical systems, having a longer focal length than the other ones of said plurality of light-guiding optical systems, illuminates a larger area than the other ones of said plurality of light-guiding optical systems.

11. The illumination optical system according to claim 8, wherein, the following condition is satisfied, $$1 < fl/fs \leq 1.2$$

where fl is the longest of all focal lengths of said plurality of light-guiding optical system, and fs is the shortest of all focal lengths of said plurality of light-guiding optical systems.

12. The illumination optical system according to claim 8, wherein each of at least two of said plurality of light-guiding optical systems includes a negative lens, and at least one of said light-guiding optical systems including a negative lens has a longer focal length than the other ones of said light guiding optical systems.

13. The illumination optical system according to claim 8, wherein each of at least two of said plurality of light-guiding optical systems has a plurality of lenses including a negative lens, and, at least one of said light-guiding optical systems differs from the other ones of said light-guiding systems in a distance by which said lenses are spaced apart.

14. The illumination optical system according to claim 8, further comprising:

a first optical element disposed between the light source and said plurality of light-guiding optical systems; and a first adjusting mechanism, which causes said first optical element to move to adjust areas being illuminated by said plurality of light-guiding optical systems, on said plurality of image display elements.

15. The illumination optical system according to claim 8, further comprising:

a second optical element, which is provided only in a light-guiding optical system having the longest light path of said plurality of light-guiding optical systems; and a second adjusting mechanism, which causes said second optical element to move to adjust an area being illuminated by said light-guiding optical system having the longest light path, on said image display element.

16. A projection type image display apparatus comprising:

an illumination optical system according to claim 8;

a color combining optical system, which combines the plurality of color light components modulated respectively by said plurality of image display elements; and a projection optical system, which projects the plurality of color light components combined by said color combining optical system onto a projection surface.

17. A projection type image display system comprising:

a projection type image display apparatus according to claim 16; and an image information supply apparatus, which supplies image information to said projection type image display apparatus, the image information being used to form an original image on said plurality of image display elements.

18. An optical system comprising:

a color separating optical system, which separates an illumination light into a first color light and a second color light;

a first light-guiding optical system, which includes a lens and guides the first color light from said color separating optical system to a first image display element; and a second light-guiding optical system, which guides the second color light from said color separating optical system to a second image display element, wherein at least one of a radius of curvature, a refractive index and an Abbe's number of said lens is designed such that a first illumination area on said first image display element is larger than a second illumination area on said second image display element.

19. A projection type image display apparatus comprising:

a light source;

a color separating optical system, which separates a light from said light source into a first color light and a second color light;

a first light-guiding optical system, which includes a lens and guides the first color light from said color separating optical system to a first image display element;

a second light-guiding optical system, which guides the second color light from said color separating optical system to a second image display element, a color combining optical system, which combines the first color light modulated by said first image display element and the second color light modulated by said second image display element; and a projection optical system, which projects the light combined by said color combining optical system, wherein at least one of a radius of curvature, a refractive index and an Abbe's number of said lens is designed such that a first illumination area on said first image display element is larger than a second illumination area on said second image display element.

20. The projection type image display apparatus according to claim 19, wherein the first color light includes a blue color light, and the second color light includes one of a green color light and a red color light.

21. A image display system comprising:

a projection type image display apparatus according to claim 19; and an image information supply apparatus, which supplies an image information to said projection type image display apparatus.

22. An image display system comprising:

a projection type image display apparatus which comprises:

a color separating optical system, which separates illumination light emitted from a light source into a plurality of color light components;

a plurality of light-guiding optical systems, each of which guides each of said plurality of color light components to a corresponding one of the plurality of image display elements;

a color combining optical system, which combines the plurality of color light components being modulated respectively by said plurality of image display elements; and a projection optical system, which projects the plurality of color light components combined by said color combining optical system onto a projection surface; and an image information supply apparatus, which supplies image information to said projection type image display apparatus, the image information being used to form an original image on said plurality of image display elements, wherein each of at least two of said plurality of light-guiding optical systems include a negative lens, and at least one of said light-guiding optical systems including said negative lens has a longer focal length than the other ones of said light guiding optical systems.

23. An image display system comprising:

a projection type image display apparatus which comprises:

a color separating optical system, which separates illumination light emitted from a light source into a plurality of color light components;

a plurality of light-guiding optical systems, each of which guides each of said plurality of color light components to a corresponding one of the plurality of image display elements;

a color combining optical system, which combines the plurality of color light components being modulated respectively by said plurality of image display elements; and a projection optical system, which projects the plurality of color light components combined by said color combining optical system onto a projection surface; and an image information supply apparatus, which supplies image information to said projection type image display apparatus, the image information being used to form an original image on said plurality of image display elements;

wherein each of at least two of the plurality of light-guiding optical systems has a plurality of lenses including a negative lens, and at least one of said light-guiding optical systems having said negative lens differs from the other ones of said light-guiding systems in a distance by which said lenses are spaced apart.

* * * * *